Sept. 29, 1925.

N. TRBOJEVICH

MACHINE FOR GENERATING BEVEL GEARS

Filed Dec. 20, 1920 2 Sheets-Sheet 1

1,555,530

Witness:

Inventor:
Nikola Trbojevich
by Frank R. Thomason
Atty.

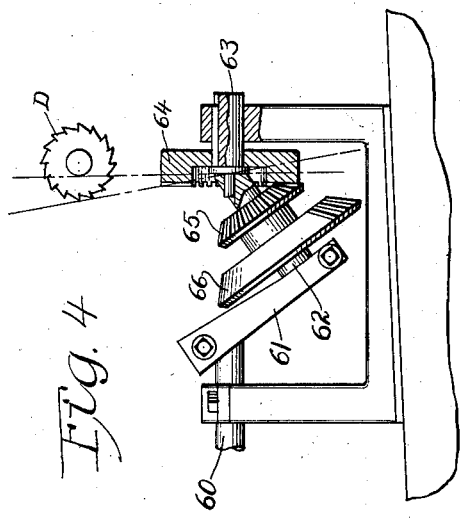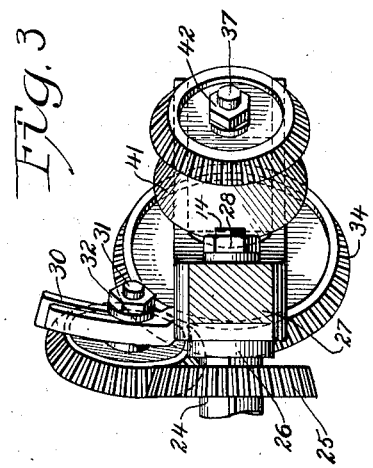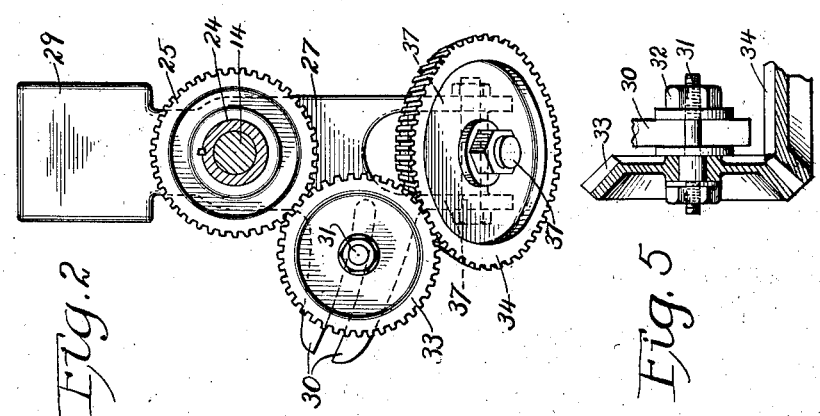

Patented Sept. 29, 1925.

1,555,530

UNITED STATES PATENT OFFICE.

NIKOLA TRBOJEVICH, OF DETROIT, MICHIGAN, ASSIGNOR TO GLEASON WORKS, OF ROCHESTER, NEW YORK, A CORPORATION OF NEW YORK.

MACHINE FOR GENERATING BEVEL GEARS.

Application filed December 20, 1920. Serial No. 431,890.

*To all whom it may concern:*

Be it known that I, NIKOLA TRBOJEVICH, a subject of the King of Yugoslavia (having declared intentions of becoming a citizen of the United States), resident of Detroit, in the county of Wayne and State of Michigan, have invented certain new and useful Improvements in Machines for Generating Bevel Gears, of which the following is a full, clear, and exact description.

My invention relates to gear cutting machines and particularly to machines for cutting bevel gears.

The principal object of my invention is to produce a machine for cutting gears, that will automatically do its own indexing, or in other words will move the blank and bring the pitch surface thereof into proper registration with the cutting tool to cut the desired number of corresponding equidistant teeth without necessitating the manual or mechanical readjustment of the blank and cutting tool every time a new tooth is to be cut. Another object of my invention is to produce teeth that will have correct rolling curves, and the proper taper and depth, and still another object is to cut both sides of a tooth by giving the blank a continuous planetary rolling movement past the milling cutter. These and other desirable objects I accomplish by the means hereinafter described, reference being had to the accompanying drawings, in which like parts are indicated by the same reference numerals.

In the drawings:

Figure 2 is a vertical transverse section taken on the broken line 2, 2, Figure 1.

Figure 3, is a horizontal section taken on dotted line 3, 3, Figure 1.

Figure 4, is a side view of a different form of my invention.

Figure 5, is a detail view.

Figure 1:
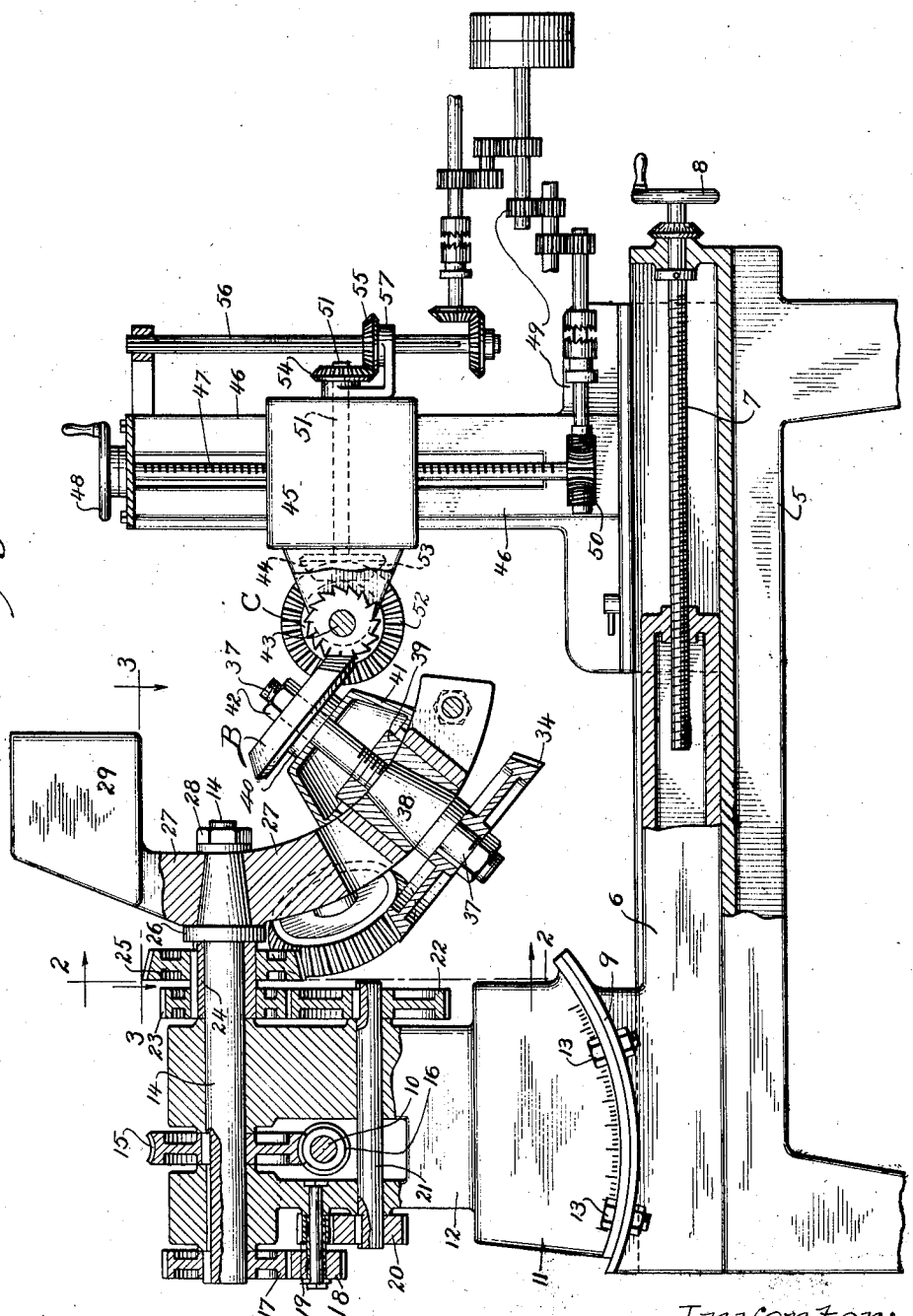
Figure 1 is a side elevation of a machine embodying my improvements showing a portion thereof in section.

Referring to Figure 1 of the drawings, 5 represents the supporting-frame or table of my improved machine, 6 the bed that is situated in one end of the channelled top thereof and is adjustable longitudinally therein by means of a longitudinally disposed screw 7. One end of this screw extends through the closed end of the top of the table and has a hand-wheel 8 on its outer end with which to turn it. The end of the bed opposite that engaged by screw 7 has a raised seat 9, whose upper laterally flanged surface is curved to conform to a segment of a circle struck from the center of a transverse drive-shaft 10. The correspondingly curved flanged base 11 of a head 12 is seated on seat 9, and just above its flanges the side of said base is provided with graduations to determine the extent to which it may be required to move the head in order to produce the desired taper to the teeth of the blank being cut, as will hereinafter be apparent. When so adjusted the head can be maintained in its changed position by the bolts and nuts 13, 13.

A longitudinal shaft or work arbor 14 is journaled in the upper part of head 12 and this arbor is revolved through the medium of a worm-gear 15, securely mounted thereon between the divided portions of the upper portion of the head, and a worm 16 on the drive-shaft, which latter extends between said divisions below the worm-gear. The ends of the work arbor extend beyond its bearings, and its rear end has a gear 17 keyed thereto that, through the idlers 18 and 19, is geared down and imparts suitable speed to a gear 20 on the corresponding end of a longitudinal shaft 21 that is parallel to the arbor 14 and is journaled in the head 12 below the drive-shaft.

The extended end of shaft 21 opposite gear 20 has a gear 22 keyed thereto which is larger than gear 20 and meshes with a smaller gear 23 keyed to a sleeve 24 that is loosely mounted on the adjacent extended end of arbor 14. Sleeve 24 is long enough to permit a bevelled gear 25 to be securely mounted thereon between gear 23 and a circumferential flange 26 that is, preferably integral with arbor 14, and between this flange 26 and its screw-threaded end, arbor 14 is tapered.

An arm 27 is secured fast on this tapered end of arbor 14 by means of a washer and a nut 28 screwed onto its screw-threaded extremity, and this arm is segmental in shape and its curvature is struck from a point in alinement with the axis of arbor 14. One branch of this segment is provided with an integral counter-weight 29, and the branch of this segment diametrically opposite said weight is longer and is, as shown in the drawings, bifurcated for about two-thirds of its length.

Near the crotch of this bifurcation the segment has a laterally projecting bifurcated arm 30, and between the parallel opposing edges of its branches a suitably shaped stud 31 is secured by means of a washer and a nut 32 is secured onto the end thereof farthest from the head 12. The portion of this stud projecting beyond the bifurcation, opposite nut 32, is increased in diameter and has a bevelled idle gear 33 loosely mounted thereon and beyond this wider portion the adjacent end portion of the stud is decreased in diameter and screw-threaded for the reception of a washer and a nut that retain the idle gear 33 in position.

This idle gear 33, meshes with a bevelled gear 34 that is keyed to the end of a spindle 37, whose axis alines with the center from which the curvature of the segmental arm 27 is struck. The diameter of the end portion of the spindle on which gear 34 is mounted is less than that of the journaled portion 38 thereof, which latter is tapered toward the opposite end of the spindle and engages a corresponding funnel-shaped bearing surface, and is retained in engagement therewith by a nut 39. This nut is screwed onto the threaded portion of the spindle, next the smaller end of its tapered journal, and it is of such size that, when it is screwed home, it bears against the contiguous annular edge of the adjacent bearing to confine the journal of the spindle in the bearing without binding the same.

Near the end of the spindle opposite gear 34 it has a washer 40 mounted thereon and between this washer and the work-arbor it is surrounded by a cone-shaped hollow spacing shell 41. The end of the portion of the spindle projecting beyond this shell is reduced in diameter and screw-threaded, and a nut 42 is screwed thereon, and between this nut and washer 40 the gear-blank B is mounted and secured fast to the spindle and revolves therewith.

The milling cutter C used in my improved machine for generating a standard involute bevel gear has straight sides and its cutting teeth are shaped so as to cut both sides of the space between the teeth. This cutter is securely mounted on one end of a transverse shaft 43, journaled in suitable brackets 44 projecting from a vertically adjustable head 45, which latter can be moved up or down on a column 46 by means of a vertical screw 47, journaled in said column, and operated either through the medium of a hand-wheel 48 on its upper projecting end, or by a gearing 49 engaging the worm-gear 50 on its lower end. The cutter-shaft 43, is driven by a longitudinally disposed jack-shaft 51 journaled in head 45, through the medium of bevelled gears 52 and 53 (the latter of which is shown in dotted lines in Figure 1 of the drawings). The rear projecting end of said jack-shaft has a mitre-gear 54 secured thereto that is engaged by a mitre-gear 55, and this latter mitre-gear is splined to a vertical shaft 56, and is held in engagement with mitre-gear 54 by a bracket 57 projecting rearwardly from head 45, and is thus able to continue imparting motion to the cutter-shaft regardless of the position to which it may be adjusted by screw 47.

In operation the segmental arm revolves at the same speed as work-arbor 14, but the speed of the blank is suitably changed by the train of gears connecting said arbor and spindle. As the segmental arm 27 revolves, the gear-blank has a planetary movement on an axis that is oblique to the axis of the said arm, and once every revolution about the axis of the work-arbor the cone-surface of the gear-blank comes into rolling contact with the teeth of the revolving cutter or milling tool C in a transverse vertical plane, that is substantially at right angles to the plane of the axis of the work-arbor. Some of the train of gears through which motion is imparted to the spindle 37 and the gear 34 mounted on the latter have relatively prime numbers of teeth, that is, the number of the teeth of the one gear does not have a common divisor with the other. As a consequence of this feature of my invention the gear-blank comes in rolling cutting contact with the cutter once during every cycle of its planetary movement and a new tooth section of the conical surface of said blank is engaged by said cutter during each cutting contact. In other words the machine will be self-indexing. By adjusting the head 12 on its seat 9 the angle of the axis of the gear-blank can be obtained to enable the milling tool or cutter C to make the proper cut in the cone-surface of the same, and, by adjusting the bed longitudinally by means of screw 7 the depth of the teeth can be regulated.

In Figure 4 of the drawings, I show another and simpler form of my improved bevelled gear generating machine. The supporting column of the cutter D of this simpler form and the means for actuating and adjusting said cutter, (which are not shown), are substantially the same as those hereinbefore described.

The work-arbor 60 of this simpler form has an arm 61 secured to one of its ends, and said arm extends obliquely therefrom, and has a fixed stud 62 securely mounted thereon that projects therefrom at right angle toward the adjacent end of a stationary shaft 63 whose axis alines with the axis of the arbor 60.

A stationary crown-gear 64 is securely mounted on the said adjacent end of the stationary shaft 63 whose axis alines with the axis of said arbor, and this crown-gear is engaged by a master mitre-gear 65 having a relatively prime member of teeth that is free to rotate on the adjacent end of stud 62. A bevelled gear-blank 66 is keyed to the master-gear 65 between said master-gear 65 and arm 61, and revolves therewith, and when shaft 60 is revolved the master-gear rolls on and is revolved by the crown-gear, and has a rolling engagement with cutter D as it travels in its planetary course transversely past the same. The periphery of cutter D is shaped the same as the cutter C employed in the machine first described herein, and when the cone-surface of the blank passes the cutter, the latter generates both sides of the space between the teeth, and produces the proper involute curve at every section of the gear being generated.

While I have described my invention in connection with a milling cutter, I do not wish to be restricted to the employment of such a tool, since it is obvious that my invention may be practised by the use of other forms of tools such as commonly used in the production of gears, for instance, planing tools, grinding tools, etc.

It is to be understood moreover that my invention is not to be restricted to the particular mechanism shown, or to the employment of this mechanism in the production of bevel gears only, as my machine is capable of various modifications and uses within the scope of the invention and the appended claims.

What I claim as new is:

1. A gear generating machine comprising a rotary tool, a support for a gear blank rotatable about two co-planar axes, and means for imparting timed rotation to said gear blank about said axes continuously in one direction to cause a periodic rolling contact with said tool.

2. A gear generating machine comprising a rotary tool, means for positively rotating a gear blank on its axis, and means for imparting an added motion to the gear-blank continuously in one direction in a transverse orbit to bring it periodically in transverse rolling contact with said tool.

3. In a gear generating machine, a rotary tool, a support for a gear blank rotatable about two coplaner axes, and means for imparting timed rotation to said gear blank support about said axes continuously in one direction to cause a periodic rolling contact between the blank mounted on said support and said tool and to automatically index the blank.

4. A gear generating machine comprising a rotary tool, a gear to which the gear blank is attached and which revolves therewith, and a gear having a relative prime number of teeth that meshes with said first mentioned gear for imparting a rolling motion to the gear-blank as it passes transversely across the periphery of said tool and brings a new point of the gear surface of the blank in which the teeth are cut in contact with said tool each time said blank engages the same.

5. A gear generating machine comprising a rotary tool means for positively rotating a gear blank continuously on its axis and means for imparting an additional continuous motion to the gear-blank in a transverse orbit that brings it in transverse rolling contact with said tool and brings a new tooth section of the blank in contact with said tool each time said blank engages the same.

6. In a machine for producing gears, a rotary tool, a blank support, means for positively imparting to the blank support a rolling motion in a closed path continuously in one direction to generate teeth on the blank, carried thereby, while in engagement with the tool, and to present the blank periodically to the tool.

7. In a machine for producing gears, a tool, a blank support, means for moving the blank support in a closed path continuously in one direction to present the blank carried thereby periodically to the tool and means for imparting to the blank support a rolling motion to generate the tooth profiles during the period of engagement of the blank with the tool.

8. In a machine for producing gears, a tool, a blank support, gearing for imparting to the blank support a continuous rotary motion about the axis of the blank and simultaneously moving the blank support in a closed path, whereby to generate the teeth on the blank, while in engagement with the tool, and to periodically present the blank to the tool, one member of said gearing being prime to another member thereof, whereby the blank is automatically indexed.

9. A machine comprising a rotatable work supporting spindle mounted for a second rotation about an axis co-planar with the spindle axis, a tool mounted in predetermined relation with the orbital path of movement of the work, and mechanism for causing a rotation about each of said axes timed in the ratio of two relatively prime numbers.

10. In a machine for generating gears, a continuously rotating tool and means for rolling a gear blank on a plane surface while in engagement with the tool to generate the teeth and in a closed path continuously in one direction to present the blank periodically to the tool.

11. In a machine for producing gears, a continuously rotating tool means for rolling a gear blank on a plane surface relatively to the tool to generate the teeth and in an endless path to index the blank.

12. In a machine for producing gears adapted to mesh with a basic crown gear, a tool representing a tooth of the crown gear, gearing for rolling a gear blank relatively to the tool to generate the tooth and return the blank periodically into engagement with the tool, one member of said gearing having a tooth number prime to the tooth number of the crown gear represented by the tool whereby a different portion of the blank is presented to the tool, each time the blank comes into engagement therewith.

13. In a machine for producing gears, a continuously rotating tool having an effective operating portion representing a rack tooth, means for imparting to the blank, while in engagement with the tool, a rolling motion as of its pitch surface rolling without slipping on a plane surface to generate the teeth and means for moving the blank bodily in a closed path to return it periodically into operative engagement with the tool.

14. In a machine for producing straight tooth bevel gears, the combination with a continuously rotating tool of a blank carrier means for moving the blank carrier to impart to the blank a continuous indexing movement and means for imparting an additional relative movement between the tool and the blank carrier to roll the tool and blank relatively to each other.

15. In a machine for producing straight tooth bevel gears, a tool, means for moving the tool in a straight path, means for rotating the blank continuously on its own axis and means for imparting an additional relative movement between the tool and blank to generate the tooth profiles.

16. In a machine for producing straight tooth bevel gears, a tool, means for imparting to a gear blank a continuous rotary movement about its axis and means for rolling the blank, without slipping, on its pitch surface, along a plane.

17. In a machine for producing straight tooth bevel gears, a continuously rotating tool, movable in a straight path across the face of the blank, a blank carrier, means for rotating the blank carrier continuously about its axis and means for imparting an additional relative movement between the tool and blank to generate the tooth profiles.

18. In a machine for producing gears adapted to mesh interchangeably with a basic crown gear, a rotary tool representing a tooth of the crown gear, means for moving the blank in a closed path about the axis of the imaginary crown gear and means for rotating the blank about its own axis in such timed relation with the first named movement that the blank is automatically indexed.

In witness whereof I have hereunto set my hand this 6th day of December, 1920.

NIKOLA TRBOJEVICH.